United States Patent [19]
Cordes et al.

[11] 3,927,225
[45] Dec. 16, 1975

[54] SCHOTTKY BARRIER CONTACTS AND METHODS OF MAKING SAME

[75] Inventors: Linus F. Cordes; Marvin Garfinkel, both of Schenectady, N.Y.

[73] Assignee: General Electric Company, Schenectady, N.Y.

[22] Filed: Aug. 15, 1974

[21] Appl. No.: 497,528

Related U.S. Application Data

[62] Division of Ser. No. 318,394, Dec. 26, 1972.

[52] U.S. Cl. .................. 427/84; 204/192; 317/5.2; 317/5.3; 317/31; 317/48.4; 317/234; 317/235; 427/91; 427/93; 427/124; 427/125

[51] Int. Cl.² .......................................... B05D 5/12

[58] Field of Search ............ 117/227, 107, 107.2 R, 117/46 CA X, ; 204/192; 317/234, 235, 5.2, 5.3, 31, 48.4; 427/84, 91, 93, 124, 125

[56] References Cited

UNITED STATES PATENTS

| | | | |
|---|---|---|---|
| 3,616,380 | 10/1971 | Lepselter | 317/235 |
| 3,770,606 | 11/1973 | Lepselter | 204/192 |
| 3,833,410 | 9/1974 | Ang et al. | 204/192 |

*Primary Examiner*—Mayer Weinblatt
*Attorney, Agent, or Firm*—Julius J. Zaskalicky; Joseph T. Cohen; Jerome C. Squillaro

[57] ABSTRACT

A Schottky barrier contact of platinum silicide on a body of silicon crystalline material is formed by heating the body to a temperature less than about 700°C and greater than 400°C and concurrently depositing platinum on a face of the body to form the contact thereto. Schottky barrier contacts so formed have an ideality factor (*n*) of close to unity. For N-type silicon in which the face of body is parallel to the <111> crystallographic plane a barrier height of about 0.78 eV is obtained. For N-type silicon in which the face of contact is parallel to the <110> crystallographic plane a barrier height of about 0.85 eV is obtained. For N-type silicon in which the face of contact is parallel to the <100> crystallographic plane a barrier height of about 0.90 eV is obtained.

9 Claims, 3 Drawing Figures

SCHOTTKY BARRIER CONTACTS AND METHODS OF MAKING SAME

This is a division of application Ser. No. 318,394, filed Dec. 26, 1972.

The present invention relates to Schottky barrier contacts and in particular to such contacts of platinum silicide to silicon semiconductor material and methods of making same.

This application is related to copending patent application Ser. No. 318,393 filed concurrently herewith and assigned to the assignee of the present application.

Schottky barrier contacts, i.e. metal-semiconductor and metallic compound-semiconductor contacts, are utilized in semiconductor devices to provide both rectifying and non-rectifying current versus voltage characteristics. The semiconductor could be a material such as silicon and the conductor member could be a metal or a metallic compound such as platinum silicide. Both the rectifying and non-rectifying characteristics of Schottky barrier contacts are dependent on barrier height ($\phi_B$), although in the case of non-rectifying contacts, the component of current flow through the contact due to electron tunneling predominates over the component of current flow due to thermionic emission over the Schottky barrier.

In a Schottky barrier rectifying contact forward voltage drop decreases with decreasing barrier height and reverse current increases with decreasing barrier height. Design of semiconductor rectifying devices including such contacts for optimum performance as a power rectifying element is a compromise between low forward voltage drop and low reverse current. The compromises available have been largely limited by the materials available as barrier height is a characteristic of the materials used.

Normally, for rectifying Schottky barrier contacts N-type semiconductor material is used, as the barrier heights of conductor-semiconductor contacts are substantially higher than for P-type semiconductor material. When contact of a conductor to a semiconductor is made to a P-type conductivity semiconductor, a Schottky barrier is also formed in which barrier height is essentially the difference between the bandgap energy of the semiconductor and the barrier height for N-type silicon. As conventionally produced Schottky barrier contacts of platinum silicide on N-type silicon have a nominal barrier height of 0.85 eV (electron-volts), such contacts to P-type silicon would have a barrier height of about 0.25 eV, would not be effective in blocking reverse currents and accordingly would not be very effective as a rectifying contact. However, when such contacts are formed on high net activator concentration semiconductor material (for example, greater than approximately $10^{19}$ atoms per $cm^3$), conduction of current across the barrier becomes dependent principally on field emission (tunneling) rather than on thermionic emission and accordingly non-rectifying or ohmic contacts are formed. The contact resistance or the slope of the voltage versus current characteristic of the contact of such a structure is also a function of the barrier height. A reduction in the barrier height of the order of 0.1 eV can produce a reduction of several orders of magnitude in contact resistance. (See Solid State Electronics, July, 1971, article entitled "Specific Contact Resistance of metal-semiconductor Barriers" by C. Y. Chang, Y. K. Fang and S. M. Sze, particularly FIG. 7).

In one aspect the present invention is directed to providing for particular materials, namely silicon and platinum silicon compounds, barrier heights significantly different from conventional processed platinum silicide contacts to silicon semiconductor material. Accordingly such contacts in one of its applications offers a designer new values of barrier height per se as well as new values in a particular combination of materials to design more nearly optimum semiconductor devices.

In another aspect the present invention is directed to providing low resistance ohmic contact of platinum silicon compounds to P-type semiconductor material.

An object of the present invention is to provide novel Schottky barrier contacts to silicon and methods of making same.

Another object of the present invention is to provide Schottky barrier contacts of platinum silicide to silicon having a range of barrier heights.

A further object of the present invention is to provide Schottky barrier contacts of platinum silicide on silicon which have a ideality factor close to unity and which may be produced with high uniformity and yield.

In carrying out the present invention in accordance with an illustrative embodiment thereof there is provided a body of silicon of N-type conductivity having a substrate layer of low resistivity and a thin layer of high resistivity epitaxially grown on the substrate layer with an exposed face lying parallel to the <111> crystallographic plane of the body. A contact of platinum silicide is formed on the exposed face by depositing platinum thereon for a sufficient time while the body is maintained at a temperature less than about 700°C and greater than about 400°C to form an appropriately thick layer of platinum silicide thereon. The surface barrier contact so formed has a barrier height of about 0.78 electron-volts and an ideality factor of close to unity.

The novel features which are believed to be characteristic of the present invention are set forth with particularity in the appended claims. The invention itself, both as to its organization and method of operation together with further objects and advantages thereof may best be understood with reference to the following description taken in connection with the accompanying drawings in which:

Figure 1:
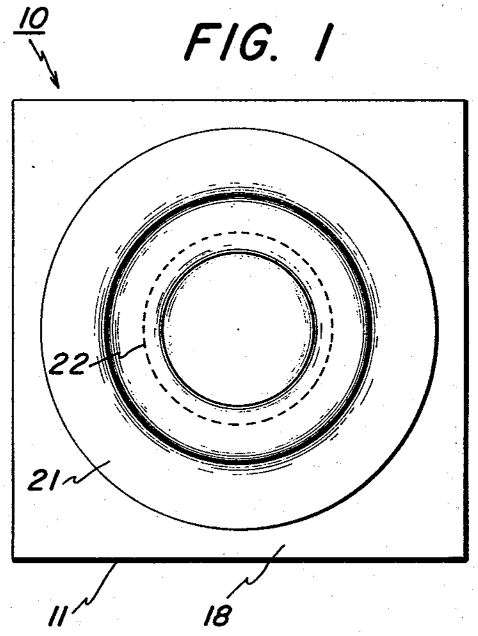
FIG. 1 is a plan view of a device embodying the present invention.
Figure 2:
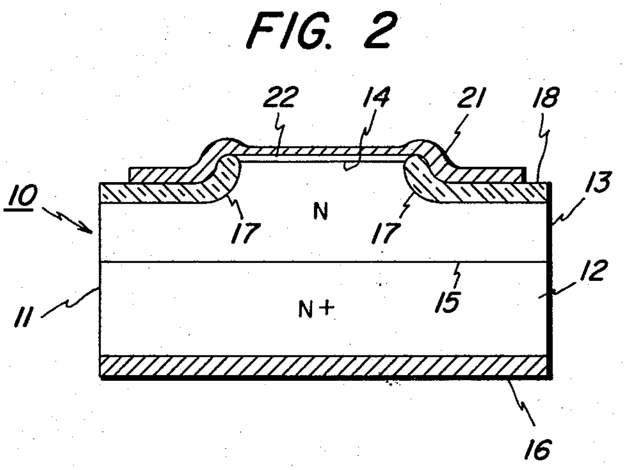
FIG. 2 is an elevational view in section of the device of FIG. 1.

Referring now to FIGS. 1 and 2, there is shown a rectifying device or diode 10 embodying the present invention which includes a wafer 11 or die having a substrate layer 12 of N-type conductivity silicon of low resistivity, for example, 0.002 ohm-cm, and a layer 13 of N-type conductivity silicon of substantially higher resistivity, for example 1 ohm-cm, epitaxially grown thereon. Techniques for epitaxially growing layers of semiconductor materials such as silicon on suitable semiconductor substrates to desired concentrations of activators or impurities are well known to those skilled in the art. The epitaxial layer 13 has a pair of opposed major faces 14 and 15. A conductive member 22 of platinum silicide formed on face 14 in a manner to be described below provides a Schottky barrier with the underlying silicon surface. The surface or face 14 of the layer 13 lies parallel to the particular crystallographic plane selected for the surface of the substrate. As described and claimed in the aforementioned copending application Ser. No. 318,393 the particular crystallographic plane selected determines the barrier height of the resultant Schottky barrier contact. The choice of the crystallographic plane is determined by the barrier height desired. The substrate 12 provides a non-rectifying connection to the epitaxial layer 13 at the face 15. A thin metal film 16 of a metal such as molybdenum deposited on the substrate provides a non-rectifying contact terminal to the substrate and hence to the epitaxial layer 13. The layer 13 has been shown etched down to provide a surface region 17 of relatively large radius to assure that in the operation of the diode under reverse bias conditions electrical breakdown will not occur along the peripheral portions of the diode. A relatively thick layer 18 of silicon dioxide covers the etched down portion and not only protects the surface of the layer 13 but also serves along with a metal film member 21 of a metal such a molybdenum extending over the oxide layer 18 to spread the electric field lines of force and further avoid high electric field intensities in the peripheral portions of the diode. The metal layers 16 and 21 form terminals for connecting the diode to an appropriate header or mounting arrangement (not shown) for utilization.

A plurality of diodes such as shown in FIGS. 1 and 2 may be readily formed on a large wafer of silicon including a low resistivity substrate layer on which has been grown a much higher resistivity epitaxial layer of silicon suitable for the application to which the diode is to be used. The substrate layer conveniently may be 10 mils thick and the epitaxial layer may be of the order of 10 microns depending on design requirements. Initially the wafer is cleaned and then oxidized to form a thin layer of silicon dioxide, for example 400 Angstroms on the exposed face of the epitaxial layer which functions to prevent surface damage to silicon by a layer of silicon nitride which is subsequently deposited thereon to a depth of approximately 2000 Angstroms. Silicon dioxide then is next used as a transfer mask to etch a pattern in the silicon nitride layer to form a plurality of areas in which surface barrier contacts such as contact 22 will be made. The portions of the silicon surface peripheral to these areas is removed to some thickness to form a plurality of mesa structures bounded by surface regions such as the surface region 17 of large radius. Another layer of oxide, for example, 5000 Angstroms thick is grown in these peripheral areas and constitutes the oxide layer 18 shown in FIG. 2 which provides the final insulating and passivating oxide on the surface of silicon layer 13. Thereafter platinum silicide is formed on the exposed silicon face by sputtering platinum on the surface 14 in suitable apparatus such as will be described in connection with FIG. 3 while the wafer 11 is maintained at a high temperature less than about 700°C and greater than 400°C for a time, for example several minutes, to form a layer of platinum silicide thereon about 600 Angstroms thick and thereafter allowed to cool to room temperature. Excess platinum is removed and final metallization films 21 and 16 are provided. The processed wafer is then diced and the chips mounted upon appropriate headers for utilization.

Heretofore in the making of platinum silicide to silicon contacts platinum would be initially deposited on an exposed surface of a silicon substrate and thereafter heated to a temperature less than 700°C for a time to form the platinum silicide to silicon barrier. Schottky barrier contacts of platinum silicide formed on N-type conductivity silicon of high resistivity by such a process provided barrier heights of about 0.85 eV.

In accordance with the present invention the deposition of platinum is accomplished while the silicon substrate is held at a substantially fixed temperature in the range of approximately 400° to 700°C. In this process platinum silicide is formed substantially simultaneous with the deposition of the platinum. Such formation produces contacts of good ideality n (values of n near unity, where n is an empirical slope factor in the equation of the forward current of the Schottky barrier contact) with good yield. In addition in conjunction with the selection of the orientation of the exposed face on which platinum silicide is formed contacts of widely different barrier heights may be obtained as is described below and as is more fully described in the aforementioned copending application Ser. No. 318,393.

Figure 3:
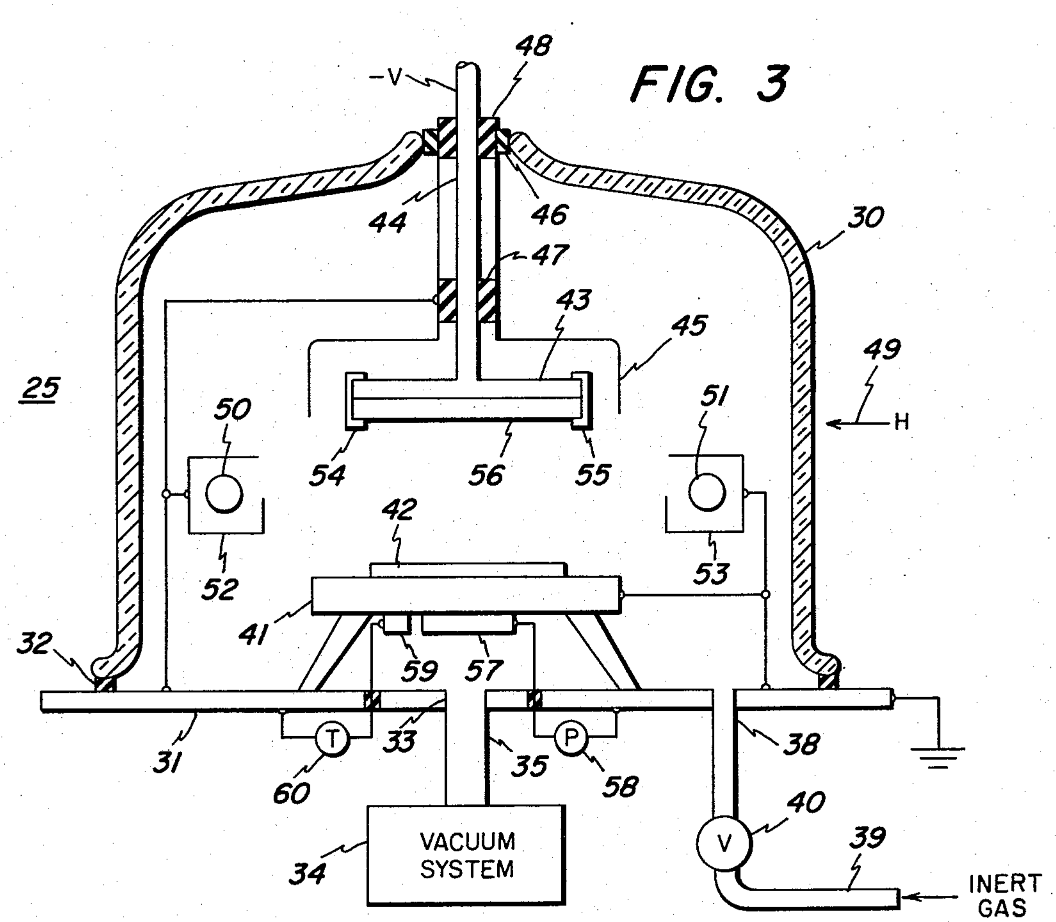
FIG. 3 is a schematic diagram of triode sputtering apparatus used for carrying out the method of the present invention and for forming the Schottky barrier contacts in accordance with the present invention.

Reference is now made to FIG. 3 which illustrates typical triode sputtering apparatus 25 suitable for forming the Schottky barrier contacts in accord with the present invention. The apparatus generally includes an evacuable chamber 30 of generally cylindrical shape with a circular base 31 with a suitable sealant, such as a gasket 32, provided between the bottom of the evacuable chamber 30 and the circular base 31 to insure isolation of the chamber from ambient conditions. Evacuation of the chamber is accomplished through an aperture 33 approximately centrally positioned within the base 31 and connected to a vacuum system 34 by an exhaust line 35. The vacuum system may typically comprise an exhaust pump and a liquid nitrogen trap to prevent contamination of the chamber 30 by feed-back through the exhaust lines during evacuation of the chamber. A second aperture 38 within the base 31 permits the admission of an inert gas such as argon, into the chamber 30 through a conduit 39 and a suitable valve 40, e.g., a motor driven variable leak valve, to continuously maintain the gaseous pressure within the chamber at a desired level.

Within the evacuable chamber 30 is a support table 41 of metallic material such as molybdenum which rests on the base 31. A large wafer 42 of silicon including a low resistivity substrate layer on which has been grown a much higher resistivity epitaxial layer of silicon such as described above is placed on the support table. The large wafer has been processed as pointed out above to the point of exposure of faces 14 of layers 13 to the deposition of platinum thereon. Positioned above the wafer 42 and in substantial alignment therewith is a cathode supporting electrode which may, for example, have a circular base portion 43 with a cathode rod 44 extending centrally from the base portion through the top of the chamber 30 for connection to a power supply which may, for example, provide a selectively variable output voltage, −V, of from 0 to 5 kilovolts. Attached to the base portion 43 by clips 54 and 55, for example, is a block or disc 56 of the platinum to be sputtered and functions as a cathode. The base portion 43 and rod 44 are surrounded by an electrical shield 45 extending longitudinally along the length of the rod and terminating along a plane generally parallel to the surface of the base portion 43. The rod 44 and electrical shield 45 are supported from the top of the chamber 30 by an annular-shaped member 46 which provides both electrical insulation from the evacuable chamber 30 and acts as a sealant to maintain vacuum in the chamber. The rod 44 is electrically insulated from the shield 45 by similar insulating members 47 and 48 spaced along the length of the rod 44. The electrical shield 45 and support table 41 are electrically grounded.

The triode sputtering system illustrated in FIG. 3 also employs an electron plasma generator comprising a pair of filaments 50 and 51 generally disposed on opposite ends of the support table 41 and intermediate the wafer 42 and cathode 56. The filaments 50 and 51 are enclosed within apertured shields 52 and 53, respectively, which are also electrically grounded. The filaments may be heated from a voltage source, such as a battery or an A.C. supply and also biased at a negative potential with respect to ground, such as –30 volts. Upon application of operating potentials to the filaments and to the shields 52 and 53, a plasma of electrons and ions is formed with the shield. Some of the generated electrons and ions pass through the apertures of each shield and appear in the region between the cathode 56 and wafer 42 where they are confined generally in a plane parallel to the surface of the cathode 56 and wafer 42 by a magnetic field schematically designated H having a direction as indicated by arrow 49.

A heating element 57 secured to table 41 is provided for the purpose of heating the table 21 which in turn heats the wafer 42, and is connected to a power source 58. A thermocouple temperature element 59 is provided attached to table 41 and connected in circuit with meter 60 to provide an indication of the temperature of the table 41.

In carrying out the method of the present invention a suitable wafer 42, such as the large wafer described above in connection with FIGS. 1 and 2, after being brought to the processing point at which it is ready to have platinum silicide contacts formed on it in accordance with the present invention, is positioned on the support table 41. The platinum cathode 56 is placed at a suitable distance, e.g., 2 to 4 centimeters, from the substrate 42. The chamber is then evacuated to a relatively low pressure of approximately $1 \times 10^{-6}$ torr. After purging the chamber, an inert gas, such as argon, for example, is introduced into the chamber. Heat is applied by heating element 57 to heat the table to a temperature sufficiently high but under a value at which the face 14 of the layer 13 would exceed about 700°C. With a potential –30 volts applied to the filament 50 and 51 with respect to the shields 52 and 53, with a potential of approximately –500 volts applied to the platinum cathode with respect to the table, with a magnetic field applied as indicated of approximately 100 gauss and with the filaments 50 and 51 energized, the plasma of electrons and positive ions is formed as indicated above and is confined in a plane parallel to and intermediate the platinum cathode 56 and substrate by the magnetic field H. With the platinum cathode at a negative potential of 500 volts with respect to ground the positive ions in the plasma are attracted to the platinum cathode 56. The positive ions bombard the platinum cathode 56 and liberate free atoms which leave the cathode and become deposited on the substrate 42. With the wafer heated the deposition of platinum is maintained for a few minutes until a thin film or layer of platinum silicide, for example 600 Angstroms thick is formed on the exposed faces 14 of the large wafer. Thereafter the wafer is allowed to cool to room temperature. In the process in accordance with the present invention, the sputtered atoms of platinum on impinging on the exposed surface of the wafer substantially simultaneously react with the silicon atoms to form platinum silicide. Such formation of platinum silicide on the silicon wafer has the beneficial results noted above and to be further described below. In this process as contrasted with the conventional process for the formation of platinum silicide-silicon contacts (in which the platinum is initially deposited as a platinum layer on the silicon wafer and subsequently the wafer is heated to form the platinum silicide contacts) the platinum silicon reaction is effected substantially simultaneously with the deposition of the platinum metal.

In the process in accordance with the present invention, when the exposed surface of the wafer is a <111> crystallographic face and maintained at a temperature of 500°C the barrier height of the contact is 0.78 eV. When the exposed face of the wafer on which the platinum is deposited has a crystallographic orientation of <110> a barrier height of 0.85 eV is obtained. Also, when the exposed face of the wafer on which the platinum is deposited has a crystallographic orientation of <100> a barrier height of 0.90 eV is obtained. Accordingly, the process of the present invention not only produces novel contacts constituted of a platinum silicon compound and silicon but novel contacts of widely different barrier heights for a given combination of materials as described and particularly claimed in the aforementioned patent application Ser. No. 318,393. In addition, the forward current versus voltage characteristics of the diodes have an ideality factor ($n$) close to unity with only very small departures (less than 5 percent) therefrom.

The following specific examples illustrate the method of the invention and some of the contacts made thereby.

EXAMPLE 1

A large wafer of silicon including a substrate layer of N-type conductivity about 10 mils thick having a resistivity of about 0.002 ohm-cm and an epitaxially grown layer of N-type silicon of about 10 microns thick having a resistivity of about 1 ohm-cm is provided with the exposed surface of the epitaxial layer parallel to the 111 crystallographic plane of the wafer. The wafer is placed on the support table of the apparatus of FIG. 3 with the exposed surface facing upward. A block of platinum is secured to the cathode supporting electrode of the apparatus at a distance approximately 3 centimeters from the wafer. The chamber is then evacuated to a pressure of approximately $1 \times 10^{-6}$ torr and argon gas is introduced into the chamber at a pressure of about $3 \times 10^{-3}$ torr. The wafer is heated to a temperature of about 500°C by heater 57. The temperature of the wafer is monitored by thermocouple 59 connected to the table 41. It has been estimated that the thermal drop between the table and the wafer is about 200°C. Accordingly, the temperature of the table is adjusted to about 700°C to obtain a wafer temperature of about 500°C. The filaments 50 and 51 are energized and biased by –30 volts with respect to shields 52 and 53 to create a plasma between the platinum cathode and the substrate. A magnetic field of 100 gauss is applied as indicated in FIG. 3, and a potential of approximately −500 volts is applied to the cathode electrode with respect to the table. The filament voltage is adjusted to yield a cathode current density of about 0.5 ma/cm$^2$. Deposition and reaction is permitted to continue for approximately 4 minutes to produce a film or layer of platinum silicide having a thickness of about 600 Angstroms. Upon cooling, the wafer is diced to provide a plurality of contacts which may be assembled in diode rectifying devices, as desired. Electrical measurements were performed on the dies and they all showed barrier heights of 0.775 ± 0.005eV with an ideality factor *n* of 1.03 ± 0.025.

EXAMPLE 2

A large wafer of silicon was provided identical to the wafer of Example 1 except that the exposed surface of the epitaxial layer of the wafer was formed so as to be parallel to the <110> crystallographic plane of the crystalline structure of the wafer. The large wafer was processed in a manner identical to the manner in which the wafer of Example 2 was processed. Electrical measurements were performed on each of the dies and they all showed barrier heights of 0.855 ± 0.005eV with a ideality factor *n* of 1.05 ± 0.01.

EXAMPLE 3

A large wafer of silicon was provided identical to the wafer of Example 1 except that the exposed surface of the epitaxial layer of the wafer was formed so as to be parallel to the <100> crystallographic plane of the wafer. The large wafer was processed in a manner identical to the manner in which the wafer of Example 1 was processed. Electrical measurements were performed on each of the dies and they all showed barrier heights of 0.90 ± 0.005eV with an ideality factor of 1.015 ± 0.01.

While the examples used to describe the invention were limited to semiconductor wafers of N-type conductivity of relatively high resistivity useful for providing rectification characteristics, the invention is equally applicable to contacts including P-type conductivity semiconductor material of both high and low resistivity to provide both rectifying and non-rectifying current versus voltage characteristics. To provide non-rectifying characteristics low resistivity material is utilized, preferably less than 0.06 ohm-cms, corresponding to a net activator concentration of greater than $10^{18}$ atoms per cm$^3$ in conjunction with a contact that provides low barrier height, for example, a wafer of P-type silicon semiconductor material having a <100> crystallographic surface on which the platinum silicide contact is formed.

Although the present invention has been described with reference to a triode sputtering system, it should be understood that the invention can be practiced by use of other sputtering systems such as, for example, dc diode sputtering and r-f diode sputtering. Deposition of the platinum may be achieved by the use of other conventional processes as well, such as evaporation from a heated source or pyrolysis of suitable platinum bearing species.

While the invention has been described in specific embodiments, it will be appreciated that modifications such as those described above may be made by those skilled in the art and it is intended by the appended claims to cover all such modifications and changes as fall within the true spirit and scope of the invention.

What we claim as new and desire to secure by Letters Patent of the United States is:

1. A method of forming a contact of platinum silicide to a body of silicon semiconductor material comprising
- exposing a face of said body,
- heating said body to a temperature greater than 400°C and less than 700°C,
- depositing platinum on said face to form a conductive layer of a platinum silicon compound thereon while maintaining said body of silicon semiconductor material at a temperature in said range of greater than 400°C and less than 700°C.

2. The method of claim 1 in which said face of said body of silicon semiconductor material is parallel to the <111> crystallographic plane thereof.

3. The method of claim 1 in which said face of said body of silicon semiconductor material is parallel to the <100> crystallographic plane thereof.

4. The method of claim 1 in which said face of said body of silicon semiconductor material is parallel to the <110> crystallographic plane thereof.

5. A method of making a contact of platinum silicide to a body of silicon semiconductor material comprising
- positioning said body with an exposed face and a body of platinum within an evacuable chamber,
- evacuating said chamber,
- heating said body of silicon to a temperature within the range of about 400°C to about 700°C,
- activating said body of platinum to vaporize platinum therefrom and to deposit platinum on said exposed face while maintaining said body of silicon semiconductor material at a temperature in said range of greater than 400°C and less than 700°C to form a conductive layer of platinum silicon compound thereon.

6. The method of claim 5 in which said source is activated for a time to form a layer of platinum silicide on said semiconductor body and in which said semiconductor body is cooled after a sufficient thickness of platinum silicide has been formed thereon.

7. The method of claim 5 in which said body of platinum is bombarded with ions of an inert gas to atomize a quantity of platinum of said platinum body.

8. The method of claim 5 in which said platinum body is heated to vaporize a quantity of platinum of said platinum body.

9. The method of claim 7 in which said inert gas is argon under low pressure in the range of approximately 1 to 10 × $10^{-6}$ torr.

* * * * *